US006996737B2

(12) United States Patent
Bass et al.

(10) Patent No.: US 6,996,737 B2
(45) Date of Patent: *Feb. 7, 2006

(54) SYSTEM AND METHOD FOR DELAYED INCREMENT OF A COUNTER

(75) Inventors: Brian Mitchell Bass, Apex, NC (US); Gordon Taylor Davis, Chapel Hill, NC (US); Marco C. Heddes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 10/680,521

(22) Filed: Oct. 7, 2003

(65) Prior Publication Data

US 2004/0085983 A1  May 6, 2004

Related U.S. Application Data

(63) Continuation of application No. 09/656,547, filed on Sep. 6, 2000, now Pat. No. 6,701,447.

(51) Int. Cl.
*G06F 1/04* (2006.01)
(52) U.S. Cl. ............... 713/502; 713/375; 370/412
(58) Field of Classification Search ............... 713/502, 713/375; 370/412
See application file for complete search history.

(56) References Cited

U.S. PATENT DOCUMENTS

| 5,446,560 | A | * | 8/1995 | Schwartz | 358/445 |
|---|---|---|---|---|---|
| 5,471,640 | A | | 11/1995 | McBride | 395/842 |
| 5,615,135 | A | * | 3/1997 | Waclawsky et al. | 702/182 |
| 5,687,173 | A | * | 11/1997 | Melden et al. | 370/235.1 |
| 5,784,554 | A | | 7/1998 | Hsiung | 395/183.21 |
| 5,790,625 | A | | 8/1998 | Arimilli | 377/54 |
| 6,360,337 | B1 | * | 3/2002 | Zak et al. | 714/47 |
| 6,530,042 | B1 | * | 3/2003 | Davidson et al. | 714/47 |

OTHER PUBLICATIONS

"Constant Delay Parallel Counters", Parallel Processing Letters, vol. 1, No. 2, pp. 143-148, Dec., 1991.
"Exact Timing with Microcontrollers", Elektronik, vol. 38, No. 11, pp. 84-86, May 26, 1989.

* cited by examiner

*Primary Examiner*—Thomas C. Lee
*Assistant Examiner*—Vincent Tran
(74) *Attorney, Agent, or Firm*—Patrick J. Daugherty; Driggs, Hogg & Fry Co., LPA

(57) ABSTRACT

A method and structure for performing a delayed counter increment is provided. The method and structure allows a counter decision to be modified based upon what the computer system hardware does with the data packet. Subsequent to the generation of a counter command, the processing of the data packet may change: for example, the data packet may be discarded instead of forwarded. Accordingly, the counter increment instruction is changed. A delayed counter increment will perform the actual counter update after the processing of the data packet is completed. In one embodiment of the invention, the counter update action is modified depending upon whether the data packet is forwarded or discarded, and a different counter is selected to be updated. This solves a problem that sometimes the forwarding code is unable to determine if some independent action may later discard a data packet.

22 Claims, 5 Drawing Sheets

FIG. 2

| Parameter | Bits | Definition |
|---|---|---|
| Counter Definition Table Index | 8 | Which Counter Definition Entry should be used for this action |
| Counter Block Index | 20 | Which set of counters should be referenced |
| Counter Number | 4 | Which counter within the set should be referenced |
| Action | 3 | What action should be performed on the counter<br><br>Modify<br>  000-Increment by 1<br>  001-Add 16 bits to counter<br><br>Read<br>  100-Standard read<br>  101-Read then Clear value<br><br>Write<br>  110-Write bits 15:0 of counter<br>  111-Write bits 31:16 of counter<br><br>All other code points are reserved |
| Add/Write Value | 16 | Value to add to counter when Modify/Add selected value to write to counter when Write selected |
| Flow Control Action | 2 | 00 - Standard Enqueue<br>01 - Random Early Discard<br>10 - Tail Early Discard<br>11 - Reserved |

FIG. 3

| BaseAddr | MemNr | 40/24 Bit | NrOfCounters | FCMode | 64 Bit | |
|---|---|---|---|---|---|---|
| | | | | | | 31 |
| | | | | | | 5 |
| | | | | | | 4 |
| | | | | | | 3 ←CntBlockDefIndex |
| | | | | | | 2 |
| | | | | | | 1 |
| | | | | | | 0 |
| 20 bits | 3 bits | 1 bit | 5 bits | 2 bits | 1 bit | |

FIG. 5

| FCMode | FCAction = 00 (Standard) | FCAction = 01 (random early discard) | FCAction = 10 (taildiscard) |
|---|---|---|---|
| 00 | Update counter with number CntrNum | Update counter with number CntrNum | Update counter with number CntrNum |
| 01 | Update counter with number CntrNum | Update counter with number (CntrNum xor 1) | Update counter with number (CntrNum xor 1) |
| 10 | Update counter with number CntrNum | Cancel counter update | Cancel counter update |
| 11 | Cancel counter update | Update counter with number CntrNum | Update counter with number CntrNum |

SYSTEM AND METHOD FOR DELAYED INCREMENT OF A COUNTER

CROSS-REFERENCE TO RELATED APPLICATION

This application is a continuation of application Ser. No. 09/656,547, filed Sep. 6, 2000, now U.S. Pat. No. 6,701,447 issued Mar. 2, 2004.

FIELD OF THE INVENTION

This invention relates generally to a method and structure for managing counter events by providing a means for delaying the processing of a counter event until the event can be processed by computer system resources. In even more particular aspects, this invention relates to managing the counting of a large number of individual events in a computer network system with large counter arrays where large volumes of information are being passed, such as, for example, in a communications network wherein at times there are a large number of packets of information containing a great number of bits being passed in a very short period of time from multiple input ports to multiple output ports, wherein a counter command is modified to reflect subsequent processing of the data packet after the counted event.

BACKGROUND ART

While the invention is not so limited, it is especially useful in communication network systems where large volumes of flames or packets of information are passed from port to port and it is necessary to statistically evaluate the system based on the traffic volume through each port and with the traffic volume between various ports, the number of packets of various sizes of information which are delivered or discarded and other information relating to the operation of the network system. One particular network system of this type is shown and described in U.S. patent application Ser. No. 09/544,896, filed Apr. 7, 2000, entitled Network Processor/Software Control Architecture, the contents of which are incorporated herein by reference as if they were fully set forth. In this type of system, data frames are received at one port from an external source such as a computer, processed and delivered from the incoming port to the required destination port. These incoming ports and destination ports may be on the same blades or different blades, and the various statistical information such as that noted above needs to be accumulated. One technique for accumulating the statistical information is to count the number of occurrences of the various events, such as data entry through a specific port, data exit through a specific port, traffic between specific ports, discarded data, the size of the frames, and other characteristics of the data and store each of these counts in some type of memory.

One particular network system for counting and storing the number of occurrences of each of a plurality of events occurring in a processor complex is shown and described in U.S. patent application Ser. No. 09/656,556, filed Sep. 6, 2000, entitled Method and Structure For Managing Large Counter Arrays, the contents of which are incorporated herein by reference as if they were fully set forth. The structure includes multiple storage devices, each of which includes a plurality of arrays of memory storage for storing count information of each event, which arrays are divided into a plurality of separately addressable groups of memory addresses in each memory array. At least one counter element is associated with each array of memory. A table is provided which contains information, including a point of reference in each array to uniquely define the structure and location of each memory array. At least one processor generates a plurality of parameters for each of the events to uniquely identify the event. A counter manager is provided which communicates with said at least one processor through its associated coprocessors and receives the parameters of each event generated from the at least one processor. The counter manager, utilizing the table and the parameters information from the at least one processor determines the unique physical address location associated with the event, reads the data from the unique address, modifies the read data according to the instructions and writes the modified data to the determined address. The invention also contemplates reading the information, which has been stored in the address without modifying the stored information for statistical evaluation.

Prior art techniques for counting an event are typically implemented as a hardware device that reads a data packet from a location in a memory device, increments the value read, and then write the incremented value back to the same memory address. The prior art methods and structures for storing such information cannot adjust the counting function after the associated data packet has been processed, such as when hardware discards a packet rather than forwards it due to system resource limitations, and the prior art therefore accept counts which are inaccurate. In a multi-processor environment, multiple processors may attempt to increment the same counter, and when this happens the prior art system must grant access to the memory location to only one processor while blocking access by any other processor, until the accessing processor has made its modification and written the modified value back. What is needed is a method and structure for delaying the increment of the counter until a later action determines the proper processing of the counter instruction. What is also needed is a method and structure for delayed increment of a counter in a multiprocessor environment.

SUMMARY OF THE INVENTION

A method and structure for performing a delayed counter increment is provided. In a preferred embodiment, a network processor creates a counter command associated with a data packet based upon examination of the data packet as it is processed through the network system. Subsequent to the generation of the counter command, the counter command may require updating: for example, the data packet may be discarded by hardware instead of forwarded. Therefore, the counter increment instruction must be changed. According to the present invention, a delayed counter increment will perform the actual counter update after the processing of the data packet by hardware. The counter update action is modified depending upon whether the data packet is forwarded or discarded: one counter is selected to be updated if the data packet is forwarded, and a different counter is selected to be updated if the data packet is discarded. This solves a problem that sometimes the forwarding code is unable to determine if some independent action may later discard a data packet.

DESCRIPTION OF THE DRAWINGS

FIG. 2 is a table showing the parameters, the number of bits in each parameter and the definition of each parameter which is used to perform the necessary operations in a counter array;

FIG. 3 is a table showing the information in a counter manager to combine with the parameters passed as shown in FIG. 2 to form an address for the counted event, and the operation that is to be performed on the counted event;

FIG. 5 is a table showing delayed increment function instructions according to the present invention.

DESCRIPTION OF THE PREFERRED EMBODIMENTS

Figure 1:
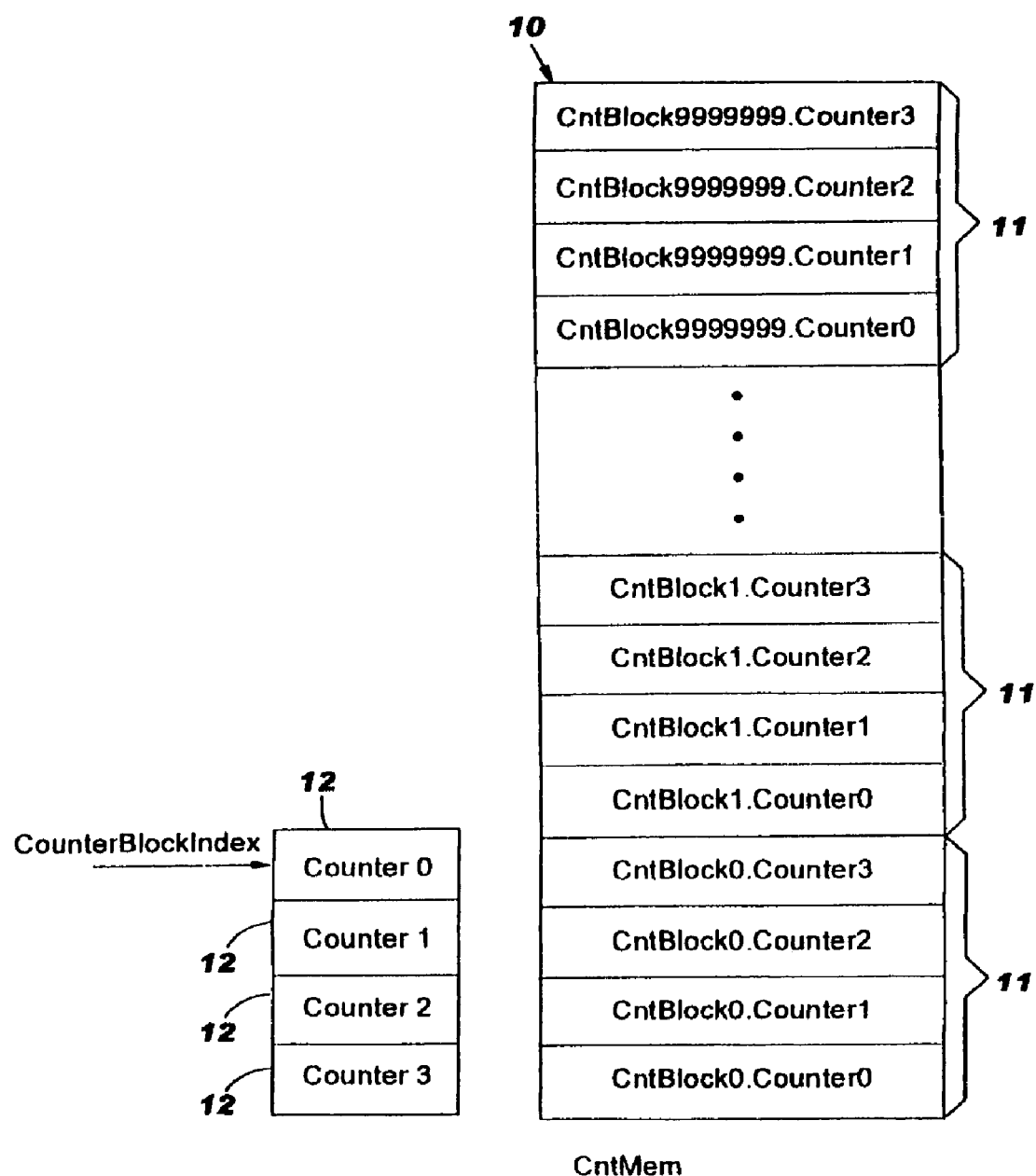
FIG. 1 is a diagrammatic representation of an addressing scheme for a memory array.

According to the present invention, a method and structure for performing a delayed counter increment is provided in a communication system generally of the type shown in said applications Ser. No. 09/544,896, and Ser. No. 09/656,556 is shown. It is to be understood, however, that this is just one illustration of how the method and structure for a delayed counter increment can be used and it has use not only in other communications systems but in other types of systems where large amounts of data are being passed and various events associated with the passing of the data need to be analyzed.

The system disclosed in application Ser. No. 09/544,896 provides a number of blades each receiving input information on a plurality of ports on each blade from external devices, such as computers, determining the destination of such information, and transmitting the data out of a port associated with the destination device. (This output port could be on the same blade or on another blade, depending upon which blade has the output port connected to the desired external device.) In order to statistically analyze the operation of this system, it is necessary to collect the number of occurrences of various different types of events that occur within the communications systems and record each occurrence of these events and retrieve this recorded information for statistical purposes. It is to be understood that the system, as shown in application Ser. No. 09/544,896, has a very large number of occurrences of events, as well as a very large number of different events that are desired to be recorded. For example, and only as an example, the number of packets of information being delivered to a given port may be recorded as well as the number of packets of information of various size being delivered to a particular port or that are dispatched from a particular port or the number of occurrences of information going from one specific port to another. Also, it may be desirable to record the number of packets either generally or by packet size of information that is discarded, rather than being transmitted. Many other types of occurrences can also be recorded, the only requirement is that these occurrences be capable of being monitored by the communication system and parameters generated which are unique to that event and will allow the calculation of a unique address from the parameters to describe the event as will be described presently.

The large number of occurrences as well as the large number of different kinds of occurrences and locations of these occurrences requires a very extensive memory system for recording each type of occurrence and, thus, it requires a large number of counter locations for such recording. The "counter manager" system more fully disclosed in application Ser. No. 09/656,556 provides a scheme and architecture for recording this large variety of different occurrences and large number of occurrences efficiently and effectively without putting an undue burden on the communication system.

A counter manager is provided which includes a number of counter block arrays, one of which arrays is shown and designated as reference character 10 in FIG. 1. The different arrays may be different physical memories, or may be separate locations within a given physical memory, or a combination of both.

Each counter block array is divided into a number of groups of addresses or counter blocks 11 for storing count information, as will be explained presently. These address blocks are designated as counter block 0, counter block 1. . . counter block 99999. Each counter block, as depicted in FIG. 1, has four address locations corresponding to the number of counters 12. These are designated in FIG. 1 as counter block 0 counter 0, counter block 0 counter 1, counter block 0 counter 2, counter block 0 counter 3, counter block 1 counter 0, counter block 1 counter 0, counter block 1 counter 1, counter block 1 counter 2, counter block 1 counter 3. . . counter block 99999 counter 0, counter block 99999 counter 1, counter block 99999 counter 2, and counter block 99999 counter 3. In the scheme as shown in FIG. 1, this particular counter block has four counters, counter 0, counter 1, counter 2 and counter 3, although a different number of counters can be provided, as will be described presently. In such a case, the number of counter or address blocks 11 in each group of addresses is equal to the number of counters 12. The number of counters 12 can vary from one array 10 to another array 10, although within the particular addressing scheme, there must be the same number of counters in each set within a specific counter array 10, i.e., there cannot be a different number of counters for each block within a single array. However, there can be a different number of counters 12 in a different array 10.

To address a specific counter within the counter array 10 shown in FIG. 1, three parameters are necessary. The first parameter is the number of the counter block group within the array to be accessed, which will indicate one of particular counter blocks 11 that is used; the second is the particular counter, i.e. counter 0, counter 1, counter 2, or counter 3; and the third is the base addresses of the given array 10. This will designate which counter block address within each group 11 is being addressed. For example, if counter block 1 is being addressed, this provides a possibility of four different counter addresses. Thus, if counter 0 within this counter block 1 is designated, this provides but a single final address, i.e. counter block 1 counter 0. Each of these individual address locations within the counter block 10 is adapted to store an updated count of the number of occurrences of any selected event which is to be stored at that particular location. Thus, with this type of addressing scheme, a large number of locations are available to store an updated count of the number of occurrences with any one of a very large number of events.

FIG. 2 shows a table listing the parameters that are generated to uniquely identify the particular counter array and the address location within a particular counter array 10 in which the number of particular events is to be stored. The parameters provide information which can be decoded as to which counter array 10 is to be used to store the information, the counter block group 11 in which this is to be stored, and the counter number 12 to uniquely identify the position within the counter block group of addresses. With these three parameters, the individual location in the correct counter block array is identified, which is unique to the particular event the counts of which are being stored. The parameters also include other information, such as what action should be performed on the counter; for example, it could be a read, it could be a write or it could be a read modify write, or any other type of operation. Also, there may be occasions in which the counter is to be modified in some other way other than by incrementing by one and this particular action is also controlled by the parameters. For example, the action might be decrement rather than increment or an increment or decrement by a value other than one. It is to be understood an addressing scheme for the various counter arrays 10 can be employed, such that the counter definition table that selects the particular counter array in which the address is found, can be designated by the counter definition table index. The most significant bits of the counter memory address are derived from the entry in this table, which corresponds to the counter definition table index. In the embodiment of the present invention shown in FIG. 2, an additional two-bit field is provided for "Flow Control Action" parameters. These parameters indicate which counter within a counter block will be incremented through the delayed counter function according to the present invention, and will be described in more detail later in this specification. As indicated above, all of these parameters are generated within the processor array and passed to the counter manager, the operation of which will be described presently.

FIG. 3 shows a table contained within the counter manager which allows the counter manager to receive the parameters generated in Table 2 and locate the proper specific address within the proper counter array and perform the indicated operations. The table includes the base or starting address for each counter array, which, in the present scheme, includes the most significant bits of the address to identify the counter array. The other information in the table includes bits to select physical memory in which is located, the type of counter, e.g. 64 bit or 32 bit counter, and the setting of the 64 bit counter when 64 bit counter is present. Where a 64 bit counter is present, two fields containing different information can be used, one of 40 bits, the other of 24 bits. Also, the number of counters within each counter block is designated. (In the preferred embodiment, the number of counters in each counter block is limited to power of 2, e.g., 1, 2, 4, 8, 16, . . . etc.). One embodiment of the invention also has a two-bit FCMode field, which corresponds to the Flow Control Action parameters of FIG. 2. These parameters will be described in greater detail later in this specification.

As can be seen, there is shown the possibility of 32 different counter arrays based on the table index given. The table index will provide a base address for entry into the counter array as well as the number of counters per counter set. According to this scheme then, the final unique address can be determined with the following equation:

The final unique address=the base address+(counter set index x number of counters per set)+counter number.

Thus, with the parameters passed from the table shown in FIG. 2 and with the use of the information shown in Table 3, the address uniquely identified within the array is quickly and easily identified. The action to be taken can then be performed which, if it's a write operation, will include a read of the data at that particular address location modifying the data (normally incremented by one) and rewriting the modified data to that location. If it's a read only operation, the data is merely read and not modified and may either be returned to the location or the data can be cleared and the counter locator reset to zero. Other actions can also be taken.

Figure 4:
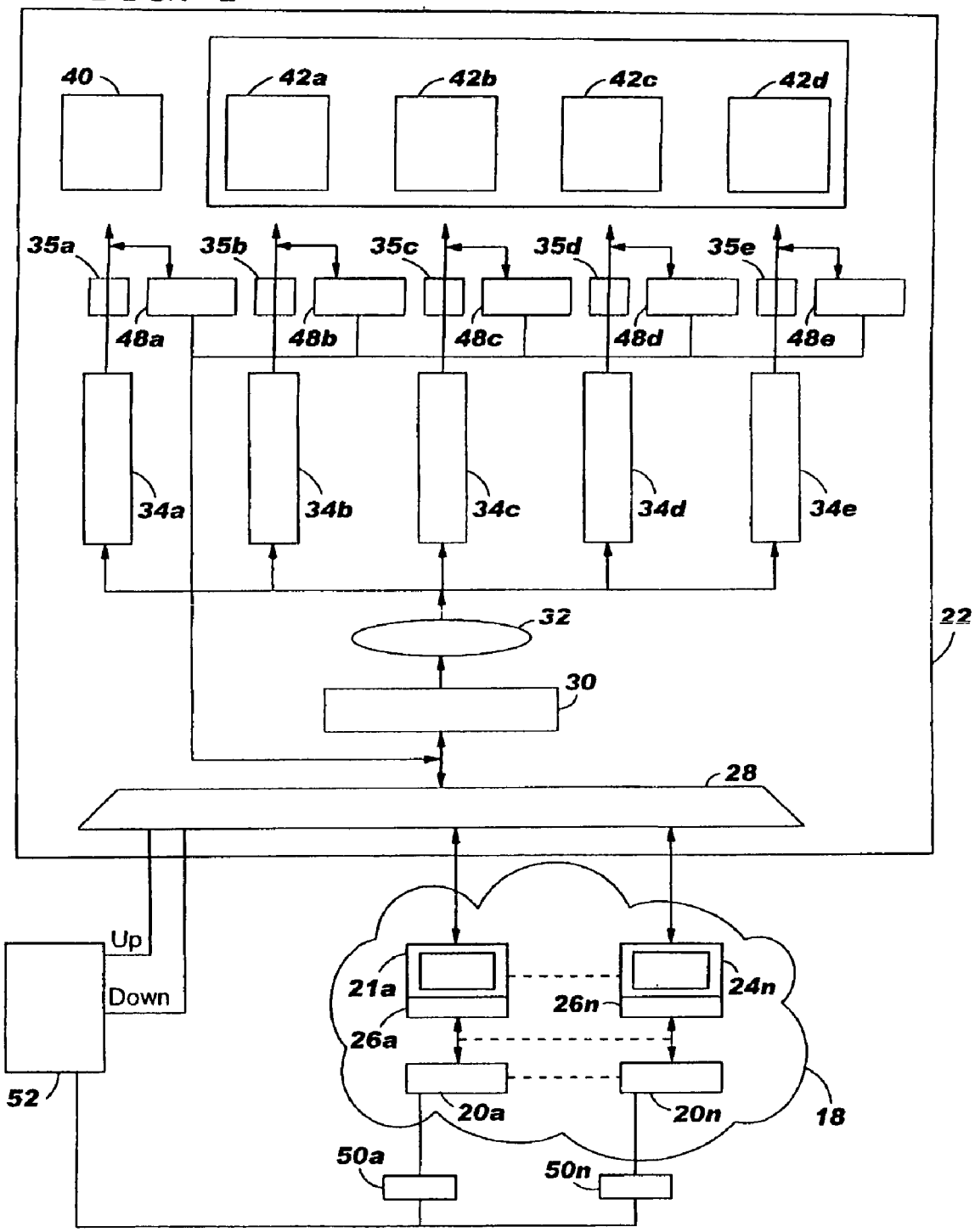
FIG. 4 is a block diagram showing the operation of the counter manager and the delayed increment counter of the present invention.

The architecture to implement this technique of recording events previously described is shown in FIG. 4. As can be seen in FIG. 4, a communication system is designated generally as 18 which can be of the type described in patent applications Ser. No. 09/544,896 and Ser. No. 09/656,556. The communication system 18 includes a number of processors or processing elements, sometimes referred to a PICO processors 20a. . . 20n. The communication system 18 includes a plurality of coprocessors 21a. . . 21n which are connected to a counter manager 22 which will count the number of each of various events that occur under the control of processors 20a. . . 20n. (The counter manager preferably is physically located within the communication system 18, but is shown separately for illustrative purposes.) The counter manager 22 is a shared resource across the coprocessors 21, and appears to each coprocessor 20 as its own associated microprocessor element. The coprocessors 21a. . . 21n are connected to the processors 20a. . . 20n and receive the information to identify each type of event which processors 20a. . . 20n have performed. The coprocessors 21a. . . 21n each have a FIFO buffer 26a. . . 26n for buffering the information from the processors 20a. . . 20n. The coprocessors 21a. . . 21n based on the receipt of the information from the processors 20a. . . 20n will receive the parameters listed in Table 2 and deliver them to an arbitrator/multiplexor 28 within the counter manager 22. The operation of the coprocessors 21a. . . 21n is described in application Ser. No. 09/548,109, filed Apr. 12, 2000, for "Coprocessor Structure and Method for a Communications System Network Processor". Preferably, and in its simplest form, the arbitrator/multiplexor is simply a round robin polling logic for polling in turn each of the coprocessors 21a. . . 21n to provide an output to counter block definition memory 30.

The counter block definition memory 30 includes the table shown in FIG. 3 as well as logic and from this table and the information received from the arbitrator/multiplexor 28 generates the address to be written based on the calculation shown above for the address, and delivers this address as the counter queue parameters 32. The counter queue parameters 32 are delivered to the proper queue control 34a, 34b, 34c, 34d, and 34e depending on the memory ID field in the table of FIG. 3, at which the proper counter queue control selects the proper address within either an internal memory 40 or one of the addresses in an DRAM chip 42a, 42b, 42c or 42d. Logic circuitry 35a, 35b, 35c, 35d, and 35e is provided to perform the read/modify/write operation on the data from the requested address location. The physical separation of the memory devices is independent of the logical partition into various memory arrays 10. Thus, one DRAM on the internal memory could hold multiple memory arrays 10. The proper manipulation of the data is then performed and data is either rewritten or discarded as the particular function dictates. If a read function is to be performed, read logic 48 is addressed which will read the information at the generated address and return the contents of the specified counter with the option, however, of clearing the counter content.

Each of the processors 20a. . . 20n also has one or more FCBPages 50a. . . 50n associated with it. The FCBPage 50 is a temporary buffer area for holding control information relating to a data packet being processed through the communication system 18. In a preferred embodiment two FCBPages 50 are associated with each processor 20, one for the receiving the "active" control information associated with the data packet being processed by the processor 20, and the other "available" and inactive. A processor 20 toggles between its two FCBPages 50, so that when it is done placing control information in the FCBPage selected and "active," the information can remain in the selected FCBPage until it is retrieved by the Egress Scheduler 52, and the other FCBPage is immediately for available to receive another counter command generated by the processing of a subsequent data packet.

In the present embodiment of the invention the control information placed in the FCBPage 50 by its associated processor 20 is a delayed counter command, said counter command generated through the processing of the data packet by the processor 20, and associated with the data packet. The counter command is passed by the arbitrator/multiplexor 28 to the counter block definition memory 30 and identifies the counter to be incremented, as described above. A processor 20 can typically execute at most one delayed counter command instruction per packet; however, the FCBPage can also be configured to handle more than one instruction per packet. In other embodiments of the invention (not shown), different types of control information may be held in the FCBPage, such as frame alteration commands, which may insert, delete or overlay specific fields of the data packet.

When one of the processors 20a . . . 20n is done processing a data packet, the processor 20 "enqueues" the packet to the egress scheduler 52 and sends a delayed increment counter command to its associated FCBPage 50a . . . 50n. "Enqueueing" the packet generally involves placing the packet in a dedicated storage device and referencing the location of the data packet with a "pointer," wherein multiple pointers are present in the queue, as is well known in the art. The packet is then processed for actual transmission by the scheduler 52, although alternative embodiments of the invention may enqueue the data packets elsewhere in the communication system 18.

The egress scheduler 52 is interfaced with the all of the FCBPages 50a . . . 50n. The scheduler 52 is a flow control hardware device that manages multiple queues and implements one or more fairness algorithms or hardware flow control means to select data packets for forwarding to a switch or output port, or for discarding. For example, the scheduler 52 may determine that not enough bandwidth is present in the network system for all of the packets enqueued for forwarding by the processors 20a . . . 20n, and may accordingly discard one or more packets. The scheduler 52 may use an algorithm that indicates forward or discard based upon the number of free buffers in the packet data storage; another algorithm may be based on the rate of change of the packets in the free data storage areas. The scheduler may also base its decision on hardware flow-control "handshaking" between this component and other hardware components in the system 18 chassis. What is new is that the present invention provides a means and a structure for modifying the delayed counter command generated by a processor 20 if the associated data packet is later discarded by the scheduler 52 rather than forwarded to the destination specified by the processor 20.

If the scheduler 52 forwards a data packet, the associated delayed counter command obtained from an FCBPage 50 correctly provides parameters to the counter block definition memory 30 identifying the counter 12 to be incremented. However, if the scheduler 52 does in fact discard a data packet, then the parameters within the counter command that identify the counter 12 to be incremented are modified, and a different counter is selected for the counter command: for example, instead of a "forwarded" counter, a "discarded" counter is incremented. In order to increment the correct counter, the scheduler 52 will pull the counter command associated with the data packet out of the FCBPage 50, modify the parameters based upon the action taken, and then send the modified counter command to the arbitrator/multiplexor 28 within the counter manager 22.

FIG. 4 shows two modes of communication between the scheduler 52 and the arbitrator/multiplexor 28. The "up" mode associated with "ingress" processing of the data packet by a processor 20, and the "down" mode is associated with "egress" or outbound processing by the processor 20. At this point the scheduler 52 appears to the arbitrator/multiplexor 28 exactly as one of the coprocessors 21a . . . 21n. When a data packet comes into an input port it is pre-processed through an "ingress" code path, to determine what output blade the data should be routed to through a switch within the communication system 18. When "ingress" processing of the packet is complete, it is sent not to an output port but to a switch, which connects it to the appropriate plug-in board, or "blade." Once the packet travels through the switch and to the other blade, then an "egress" code path is taken by the packet and the packet is placed in condition for transmission.

When the packet is enqueued and the scheduler 52 has performed the flow control action, the parameters are passed to the arbitrator/multiplexor 28. Referring now to FIG. 5, a table listing delayed increment function instructions according to one embodiment of the present invention is provided. "FCAction" is a two-bit value, and represents the "flow control action" parameters shown in FIG. 2, and the "FCMode" bits shown in FIG. 3, both of which are discussed above. FCAction=00 denotes that the frame will be forwarded, otherwise the frame will be discarded. Depending on the FCMode field in the counter block definition memory 30 and the FCAction parameters, the counter manager 22 may cancel the counter command instruction. Alternatively, the counter manager 22 may execute the counter command with a modification to the parameters: for example, the counter number field may be altered and a different counter 12 within the counter block 11 designated by the parameters may be selected for incrementation. An exemplary operation is as follows. Assume a counter block with two counters (not shown): "Counter0" counting the number of forwarded frames and "Counter1" counting the number of discarded flames. The counter block is programmed to have a FCMode field=01 in the counter block definition memory. The counter command is executed as a delayed counter increment and with CntrNum=0. Thus, when the frame is forwarded, the Counter Manager will update Counter0, otherwise counter (0 xor 1), i.e. Counter1, will be incremented.

Another example of parameters and actions associated with one embodiment of the invention is provided in the table of FIG. 5. The FIG. 5 fields provide modification to counter command parameters to change the counter 12 selected within a counter block 11 specified by the parameters. "FCAction=01" is used to increment the counter command when the scheduler 52 discards the data packet through a "random early discard." This is a mechanism used by a typical flow control hardware device to randomly select packets for discarding, such as when the communication system 18 has reached its capacity and is "back-up" and cannot process all of the packets currently in the system. The selection may be "weighted random" selection, where packet traffic may be separated into types or flows, and a different random weighting may be assigned to each of the types for selecting packets to discard. The amount and type of weighting assigned to the packets and the number of packets discarded is determined by the scheduler 52, based upon the extent of the problem present in the communication system 18.

FCAction=10 is used to increment the counter command when the scheduler 52 discards the data packet through a "tail discard," also known in the art as "tail drop." This occurs when the data packet queue is full to maximum capacity and no more packet data storage is available, and therefore there is simply no place to put subsequent new data packets. It is apparent that new packets will be discarded without the ability of the scheduler 52 to categorize and maintain preferred data types in favor of less preferred data types, as can be achieved with the "random early discard." Accordingly, this is a disfavored mechanism for discarding packets.

In a different and preferred embodiment of the invention, the scheduler 52 passes the two-bit flow control action value to the counter manager 22, and the FCAction value is used by the counter manager 22 to increment or not increment the counter definition table index. Therefore this embodiment provides a means for altering the array 10 identified by the counter command, while the counter block index and counter number fields are preferably held constant. In particular, as discussed in the prior embodiment, the scheduler 52 generates the FCAction parameters according to the disposition of the event and passes them to the counter manager 22. When a packet is forwarded, the scheduler 52 sets FCAction=00, and the counter definition table index is not incremented by the counter manager 22. Therefore the array 10 counter block 11 counter 12 specified by the counter command as generated by the processor 20 is chosen for the counter operation specified by the parameters shown in FIG. 2. However, when a packet is discarded through random early discard by the scheduler 52, the scheduler 52 sets FCAction=01, and the counter definition table index is accordingly incremented by 1 by the counter manager 22: since the counter block index and the counter number fields are not incremented, then the corresponding counter block 11 counter 12 within another array 10 is chosen for the counter command operation. Additionally, when a packet is discarded through tail discard, the scheduler 52 sets FCAction=02, and the counter definition table index is accordingly incremented by 2 by the counter manager 22: similarly, since the counter block index and the counter number fields are not incremented, then the corresponding counter block 11 counter 12 within yet another array 10 is chosen for the counter command operation. It is important that in this embodiment the table used by the counter manager 22 to locate a specific counter 12 does not contain the FCMode field, as shown in FIG. 3: this two-bit field is instead reserved.

As discussed above, while within the particular addressing scheme, there must be the same number of counters in each set within a specific counter array 10, the number of counters 12 can vary from one array 10 to another array 10. Therefore, by allowing the delayed increment counter command to be altered to indicate a different array 10, counter blocks or dissimilar size may be selected based upon the handling of a data packet by the scheduler 52.

The preferred embodiment of the present invention has been described. With the foregoing description in mind, however, it is understood that this description is made only by way of example, that the invention is not limited to the particular embodiments described herein. For example, although the embodiment shown in FIG. 4 uses an egress scheduler 52, alternative embodiments of the invention may instead use a hardware routing mechanism that may route the data packet to the least busy port. In this arrangement (not shown), it would be desirable to count the number of packets sent to each port. In this case, the counter index modification issue would not concern discarded packet counters or transmitted packet counters, but would instead concern a "transmit on port A" counter modified to reflect instead a "transmit on port B" counter. Accordingly, various rearrangements, modifications, and substitutions may be implemented without departing from the true spirit of the invention as hereinafter claimed.

What is claimed is:

1. A method of delaying the counting of a number of occurrences of each of a plurality of events occurring in a processor complex having at least one processor until the disposition of an event has been determined, comprising the steps of:

providing at least one array of memory storage for storing count information for each of the plurality of events;

providing a plurality of separately addressable groups of memory addresses in each of the at least one array of memory storage;

providing at least one counter associated with each array of memory storage;

said at least one processor generating a plurality of counter parameters for each of the plurality of events, said counter parameters uniquely identifying each of the plurality of events, specifying a counter operation, and specifying one of the at least one counter for the operation;

providing a means for altering the disposition of an event, said means enabled to modify said parameters;

disposing a first event with the means for altering to create a first event disposition;

the means for altering modifying or not modifying the parameters responsive to the first event disposition; and subsequently selecting an at least one counter and performing a counter operation on the selected counter responsive to the parameters.

2. The invention of claim 1, further comprising the steps of:

passing the parameters of each of the plurality of events generated by said at least one processor to at least one temporary buffer; and the means for altering retrieving the parameters from the at least one temporary buffer.

3. The invention of claim 1 wherein the step of disposing the first event comprises forwarding the first event according to the parameters generated by the at least one processor, and wherein the step of modifying or not modifying the parameters comprises the step of not modifying the parameters.

4. The invention of claim 1 wherein the step of disposing the first event comprises the step of discarding the first event, and the wherein the step of modifying or not modifying the parameters comprises the step of modifying the parameters, said modification resulting in a change of destination for the counter operation to a different counter with respect to the counter specified by the parameters prior to their modification.

5. The invention of claim 4, further comprising the step of the means for altering the disposition of an event performing a read modify write sequence on the different counter.

6. The invention of claim 4 wherein the means for altering the disposition of an event comprises at least one flow control algorithm, and the first event is discarded according to the algorithm.

7. The invention of claim 4 further comprising the steps of:
  providing a queue for holding said events, said queue having a maximum capacity for holding events; and enqueueing said events in said queue;
  and wherein the step of disposing said event comprises the step of discarding the event, said discarding step responsive to the queue containing more events than said maximum capacity.

8. The invention of claim 4, further comprising the steps of:
  providing a table which contains information including a point of reference in each array to uniquely define the structure and location of each array of memory; and
  providing a counter manager communicating with said at least one processor and said memory arrays and said means for altering the disposition of an event; and
  wherein the step of performing a write operation further comprises the steps of:
  passing the parameters from the means for altering to said counter manager after the step of modifying or not modifying the parameters; and
  said counter manager, utilizing said table and said parameters of information from said at least one processor, determining the unique physical address location associated with the first event, reading the data from said determined address, modifying the read data and writing the modified data to the said determined addresses.

9. The invention of claim 8, wherein one of said parameters for each event includes a counter definition table index that identifies the counter definition entry to be used for a particular action.

10. The invention of claim 9 wherein one of said parameters for each of said events is a counter index and wherein there are a plurality of counters associated with each counter definition entry.

11. The invention as defined in claim 8 further characterized by said parameters including a counterset index, the number of counters per set and the counter number to be used for a particular address.

12. A structure for delaying the counting of a number of occurrences of each of a plurality of events occurring in a processor complex having at least one processor until the disposition of the event has been determined, comprising:
  at least one array of memory storage for storing count information for each event in circuit communication with said at least one processor;
  a plurality of separately addressable groups of memory addresses in each of the at least one array of memory;
  at least one counter associated with each array of memory;
  a plurality of parameters generated by said at least one processor for each of said events, said counter parameters uniquely identifying each said event, specifying a counter operation, and specifying one of the counters for the operation;
  a means for altering the disposition of an event connected in circuit communication with said counters, said means enabled to modify said parameters
  wherein said means is configured to dispose a first event, retrieve the parameters, and decide to modify or not modify the parameters responsive to a disposition of the first event where the disposition indicates whether modification is required; and
  a counter means configured to subsequently select an at least one counter and perform a counter operation on the selected counter responsive to the parameters.

13. The structure of claim 12 further comprising at least one temporary buffer connected to the at least one processor and the means for altering the disposition of an event and configured to receive the parameters from the at least one processor, wherein the means is configured to retrieve the parameters from the at least one temporary buffer.

14. The structure of claim 12 wherein the means is configured to dispose the first event by forwarding it according to the parameters generated by the at least one processor and responsively not modify the parameters.

15. The structure of claim 12 wherein the means is configured to dispose the first event by discarding the event and responsively modify the parameters.

16. The structure of claim 15 wherein the means is configured to responsively perform a read modify write sequence on the different counter.

17. The invention of claim 15 wherein the means comprises at least one flow control algorithm, and the first event is discarded according to the algorithm.

18. The invention of claim 15, further comprising a queue for holding said events, said queue having a maximum capacity for holding events, wherein the events are enqueued said in said queue and wherein the first event is discarded responsive to the queue containing more events than said maximum capacity.

19. The invention of claim 15, further comprising:
  a table which contains information including a point of reference in each array to uniquely define the structure and location of each array of memory; and
  a counter manager communicating with said at least one processor and said memory arrays and said means for altering the disposition of an event;
  wherein the counter manager is configured to receive the parameters from the means after the means has modified or not modified the parameters; and
  said counter manager, utilizing said table and said parameters of information from said at least one processor, is configured to determine the unique physical address location associated with said first event, read the data from said determined address, modify the read data and write the modified data to the determined addresses.

20. The invention of claim 19, wherein one of said parameters for each event includes a counter definition table index that identifies the counter definition entry to be used for a particular action.

21. The invention of claim 20 wherein one of said parameters for each of said events is a counter index and wherein there are a plurality of counters associated with each counter definition entry.

22. The invention as defined in claim 19 wherein said parameters further comprise a counterset index, the number of counters per set, and the counter number to be used for a particular address.

* * * * *